(12) United States Patent
Banin et al.

(10) Patent No.: US 10,670,229 B2
(45) Date of Patent: Jun. 2, 2020

(54) EMITTING FILM WITH IMPROVED LIGHT-OUT COUPLING

(71) Applicant: YISSUM RESEARCH DEVELOPMENT COMPANY OF THE HEBREW UNIVERSITY OF JERUSALEM LTD., Jerusalem (IL)

(72) Inventors: Uri Banin, Mevasseret Zion (IL); Ehud Shaviv, Modi'in (IL); Denis Glozman, Ashdod (IL); Hagai Arbell, Jerusalem (IL)

(73) Assignee: YISSUM RESEARCH DEVELOPMENT COMPANY OF THE HEBREW UNIVERSITY OF JERUSALEM LTD., Jerusalem (IL)

( * ) Notice: Subject to any disclaimer, the term of this patent is extended or adjusted under 35 U.S.C. 154(b) by 0 days.

(21) Appl. No.: 15/321,091

(22) PCT Filed: Jun. 25, 2015

(86) PCT No.: PCT/IL2015/050655
§ 371 (c)(1),
(2) Date: Dec. 21, 2016

(87) PCT Pub. No.: WO2015/198327
PCT Pub. Date: Dec. 30, 2015

(65) Prior Publication Data
US 2017/0153007 A1    Jun. 1, 2017

Related U.S. Application Data

(60) Provisional application No. 62/017,389, filed on Jun. 26, 2014.

(51) Int. Cl.
*F21V 9/30* (2018.01)
*G02F 1/1335* (2006.01)
(Continued)

(52) U.S. Cl.
CPC .............. *F21V 9/30* (2018.02); *F21V 9/14* (2013.01); *F21V 11/00* (2013.01); *G02B 1/14* (2015.01);
(Continued)

(58) Field of Classification Search
CPC .......... F21V 9/30; F21V 9/14; G02B 5/0268; G02B 1/14; G02B 5/0247
See application file for complete search history.

(56) References Cited

U.S. PATENT DOCUMENTS 6,958,860 B2    10/2005  Dontula et al.
8,197,931 B2     6/2012  Ueda et al.
(Continued)

FOREIGN PATENT DOCUMENTS

JP    H11212091 A    8/1999
JP    2004133460 A   4/2004
(Continued)

OTHER PUBLICATIONS

International Search Report for PCT/IL2015/050655 dated Sep. 5, 2015.
(Continued)

*Primary Examiner* — Evan P Dzierzynski
(74) *Attorney, Agent, or Firm* — Millen White Zelano and Branigan, PC; John Sopp (57) ABSTRACT

The present invention provides an optically active structure and the use thereof in a backlight unit. The optically active structure comprises a plurality of optically active particles configured to emit light of one or more predetermined wavelength range in response to pumping energy, and a plurality of light scattering elements. The plurality of light scattering elements comprises optically transparent void regions, such as void regions surrounding filler particles.

25 Claims, 5 Drawing Sheets

(51) Int. Cl.
  *G02F 1/13357*   (2006.01)
  *F21V 8/00*      (2006.01)
  *G02F 2/02*      (2006.01)
  *G02B 1/14*      (2015.01)
  *F21V 9/14*      (2006.01)
  *F21V 11/00*     (2015.01)
  *G02B 5/02*      (2006.01)

(52) U.S. Cl.
  CPC ......... *G02B 5/0247* (2013.01); *G02B 5/0268* (2013.01); *G02B 6/0041* (2013.01); *G02F 1/133606* (2013.01); *G02F 2/02* (2013.01); *G02B 6/0003* (2013.01); *G02B 6/0043* (2013.01); *G02B 6/0053* (2013.01); *G02B 6/0055* (2013.01); *G02B 2207/101* (2013.01); *G02F 1/133611* (2013.01); *G02F 2001/133614* (2013.01); *G02F 2202/10* (2013.01); *G02F 2202/108* (2013.01); *G02F 2203/03* (2013.01)

(56) References Cited

U.S. PATENT DOCUMENTS

| | | |
|---|---|---|
| 9,529,228 B2 | 12/2016 | Banin et al. |
| 10,090,443 B2 | 10/2018 | Xu et al. |
| 10,302,845 B2 | 5/2019 | Dubrow et al. |
| 2011/0068322 A1* | 3/2011 | Pickett ................ C09K 11/02 257/13 |
| 2011/0195239 A1* | 8/2011 | Takane ............ B29D 11/00865 428/206 |
| 2012/0113672 A1 | 5/2012 | Dubrow |
| 2014/0009902 A1 | 1/2014 | Banin et al. |
| 2014/0247486 A1* | 9/2014 | Shibata ................. G02B 1/04 359/488.01 |
| 2014/0254131 A1* | 9/2014 | Osinski ................ B82Y 20/00 362/84 |
| 2014/0340865 A1 | 11/2014 | Hikmet et al. |

FOREIGN PATENT DOCUMENTS

| | | |
|---|---|---|
| JP | 2013544018 A | 12/2013 |
| JP | 2014502403 A | 1/2014 |
| WO | 08093623 A1 | 8/2008 |
| WO | 2012059931 A1 | 5/2012 |
| WO | 13046130 A1 | 4/2013 |
| WO | 13057702 A1 | 4/2013 |
| WO | 2013046130 A1 | 4/2013 |

OTHER PUBLICATIONS

Notice of Reasons for Refusal in corresponding Japanese Patent Application No. 2016-575422 dated Jul. 26, 2019 (pp. 1-5).

* cited by examiner

Fig 5

EMITTING FILM WITH IMPROVED LIGHT-OUT COUPLING

TECHNOLOGICAL FIELD

This invention is generally in the field of light source systems, and relates to a light source device configured to emit light. The technique of the invention is particularly useful for a backlight unit in a display device.

BACKGROUND ART

References considered to be relevant to the background to the presently disclosed subject matter are listed below:
1. WO 2012/059931, Qlight Nanotech
2. U.S. Pat. No. 7,327,415, Rohm and Hass
3. U.S. Pat. No. 6,958,860, Eastman Kodak
4. U.S. Pat. No. 8,197,931, Toray Industries
5. US 2012/0113672, Nanosys
6. US 2014/0021440, QD Vision
7. WO 2010/095140, Qlight Nanotech Acknowledgement of the above references herein is not to be inferred as meaning that these are in any way relevant to the patentability of the presently disclosed subject matter.

BACKGROUND

Flat-panel displays are widely used in various electronic devices such as computers, mobile phones and televisions sets. Liquid Crystal displays (LCDs) present a major part in image generation in flat-panel displays. LCD devices typically include a backlight unit for illumination of the LC panel, which is a multi-layer structure including a liquid crystal spatial modulation layer selectively transmitting light within each pixel of the display. The selective light transmission through the different pixels is controlled by changing orientation and arrangement of the liquid crystal molecules and thus allowing light of corresponding polarization to be transmitted therethrough.

LCD devices and the operation thereof relates to affecting polarization of light passing through the LC panel. Therefore, to provide efficient operation of the display, the input illumination arriving into the LC panel should preferably be polarized. Such polarized input illumination may be provided by transmitting light from a backlight unit through a polarizer (or a plurality of polarizers). However, operation of the display device may benefit from a use of backlight unit configured to provide polarized light by itself. Typical commercially available white color LCD backlight units use non-polarized light sources (i.e. light that has no specific polarization) and a polarizer located in optical path between the backlight unit and the liquid crystal panel. In such configuration, the selection of a particular polarization for the back-illumination comes at the cost of energy loss. Generally, about 50% of light emitted by a non-polarized light source may be lost due to the light passage through a linear polarizer. This problem may be significant for various display systems, where energy saving is a crucial factor. In portable devices such as laptops, cellular-phones, tablets, etc. where battery life and increased backlight brightness are important factors.

Backlight units based on emission properties of nanoparticles have been developed and are described for example in WO 2012/059931, assigned to the assignee of the present application. According to this technique, an optically active structure is provided, which may be used as color polarized light source for display systems. The structure comprises at least two different groups of optically active nanorods differing from one another in at least one of wavelength and polarization of light emitted thereby in response to a pumping field. The nanorods of the same group are homogeneously aligned with a certain axis of alignment.

GENERAL DESCRIPTION

There is a need in the art for a novel approach for configuring a high efficiency light emitting film. Such film may utilize wavelength conversion of input light and/or emit light in response to pumping energy. Specifically, the light emitting film may generate substantially polarized light. The optically active film as described below utilizes light scattering elements embedded within the optically active film and configured for maximizing light emission in a desired direction while maintaining or at least partially maintaining polarization state of the emitted light (i.e. specific polarization state/orientation). Typically according to the present invention the plurality of scattering elements comprise optically transparent void regions around filler particles within the film/structure.

The configuration of the optically active structure according to the present invention may provide increased illumination efficiency. Typically such increased efficiency enables providing similar brightness to the display system while utilizing reduced power consumption, or increase brightness for a given power consumption. This could be beneficial for portable devices such as laptops, cellular-phones, tablets, etc. where battery life and increased backlight brightness are important factors. Additionally, it should be noted that high resolution display system such as ultra-high definition (such as 4K or 8K display systems) may utilize greater brightness due to reduced transmission characteristics though the highly dense LC panel.

The present invention provides a light source system and an optically active structure (film) suitable for use in a light source system which provides polychromatic optical radiation. The optically active structure of the invention utilizes optically active particles embedded in a matrix and configured to emit light of one or more predetermined wavelength ranges in response to a pumping field (e.g. optical pumping or electrical excitation). The optically active particles may generally be nanoparticles (e.g. semiconductor nanoparticles) configured to emit light in response to pumping energy. The structure also comprises plurality of scattering elements configured of particles (filler particles), surrounded by void regions. The scatterers are preferably embedded in the same matrix defining a layer of the optically active structure or embedded in one or more additional layer thereby defining an optically active structure comprising two or more layers. Generally, the filler particles are optically transparent, i.e. not absorbing, with respect to one or more wavelength ranges (corresponding to the pumping field and to the emitted light).

It should be noted that in the context of the present application the term void refers not only to an "empty" region filled by vacuum, but generally refers to a region within the film that includes material being different from its surroundings and typically with a refractive index lower than the surroundings. More specifically, a void is a region with vacuum or filled with gas, but may also be a region filled with material which is similar to that of the surrounding but is defined by lower density and lower refractive index. Thus, the scatterers are generally configured as particles/fillers being transparent to optical radiation of the emitted light and being surrounded by regions of voids within the material of the layer matrix.

The optically active nanoparticles may comprise anisotropic nanoparticles (nanorods) that may be aligned within the layer/film so as to emit substantially polarized light with a predetermined polarization orientation. In this connection it should be noted that the term substantially polarized light refers to light having polarization ratio (ratio between intensity of light component having the desired polarization and light components having the undesired polarization) higher than 1.1, and preferably higher than 2.5 and more preferably higher than 3.5. In some configurations, the use of aligned anisotropic nanoparticles (nanorods) provides illumination with polarization ratio of 4 and more. Additionally, the scatterers are configured to be polarization preserving or at least partially polarization preserving scatterers such that light emitted out of the film maintains its polarization state (i.e. polarization orientation). The scatterers are configured for maximizing light output from the layer/film while maintaining its polarization state (e.g. polarization orientation).

More specifically, in some embodiments of the invention, the optically active structure/film comprises a matrix containing aligned nanorods of selected sizes, material composition and structure. The nanorods are configured to emit light in response to exciting field (e.g. optical pumping) while alignment of the nanorods provides the emitted light with a predetermined polarization orientation. The optically active structure/film also comprise a scattering configuration, which comprises plurality of scatterers configured to vary propagation direction of light components impinging thereon. The scattering configuration may be integral with the optically active structure/film or attached thereto, and may also include additional optical elements external to the film. The scattering configuration is preferably configured to be polarization preserving (i.e. maintaining the polarization state and/or orientation of light interacting therewith). For Example, the optically active structure may include, or be attached to, one or more light directing/redirecting elements as described in PCT application number IL2015/050341 assigned to assignee of the present application.

It should be noted that, generally, the light scattering configuration may or may not be polarization preserving with regard to light passing through/interacting with various optical elements commonly used inside an LCD backlight, e.g. reflector, light-guides, diffusers, brightness enhancement film, etc. as well as with respect to light propagation between the backlight unit and a spatial modulation (liquid crystal) layer. In some embodiments of the present invention, it provides various backlight film stack configurations in order to obtain polarized or partially polarized emission based backlighting by integrating the polarized light source together with other complementary optical elements. Thus, the structure and composition of the backlight optical stack comprising of optical elements such as reflector, light-guides, diffusers, brightness enhancement film of the invention may, in some embodiments, be carefully designed to maintain or at least partially maintain the desired polarization of output light directed to the liquid crystal layer (e.g. pixel matrix).

The light emitting film may generally be configured for use in a backlight unit within a Liquid Crystal Display device (LCD). In such applications, emission of polarized light is beneficial, providing the LCD device with higher energetic efficiency.

The use of optically active nanorods as emitting media may provide additional advantages over the use of isotropic emitting particles. Generally, emission of nanorods, acting typically as dipole-like emitting elements, is substantially directional being substantially perpendicular to the long axis of the nanorods. This enables the aligned ensemble of nanorods in the film to provide better emission compared with "regular" quantum dots since more light is emitted in a required direction and less light needs to be scattered by the scattering elements. This reduces the energy loss associated with light components scattered towards undesired direction as well as reduces loss due to absorbing properties and depolarization properties of the scattering material. Thus, the use of aligned nanorods provides not only substantially polarized illumination, but may also be beneficial over spherical particles or non-aligned nanorods in providing greater efficiency in light conversion as well as certain preference in direction of the emitted light.

The polarized light source according to the present invention is configured to operate utilizing backlight unit that provides polarized emission. As indicated above, this reduces losses caused by filtering of light components of the undesired polarization and thus provides for lower power consumption and/or brighter screens. As also indicated above, the polarized emission of the backlight unit originates as a result from the use of a polarized light source based on aligned anisotropic nanostructures, which may be colloidal semiconductor nanorods.

For the purposes of a backlight unit, a polarized light source may contain a homogeneous mixture of at least two groups of optically active nanorods, differing from each other in the emission wavelength. Preferably, such mixture contains green (central wavelength in the range of 520-560 nm) and red (central wavelength in the range of 600-650 nm) emitting nanorods, and may also include nanorods configured to emit light in additional wavelength ranges (e.g. blue). The polarized light source may be excited by pumping light from a pumping light source e.g. LEDs, and may include illumination with blue light, e.g. having central wavelength in the range of 440-460 nm. The concentration of emitting nanorods in the active layer may be adjusted to allow part of the incident pumping light to be transferred through the layer, or configured to provide maximal absorbance of the pumping light. For example, in configuration where the pumping light is of wavelength range corresponding to blue light, the optically active structure is configured such that the nanorods emit the complementary green and red light needed to produce white light. Alternatively, the optically active structure may include nanorods emitting in red, green and blue, in response to UV or violet pumping light. In this configuration the optically active structure is preferably configured for maximal absorption of the pumping light to reduce losses due to filtering out of the remaining intensity of the pumping light.

Thus, according to a broad aspect of the present invention there is provided an optically active film/layer, comprising optically active particles configured to emit light of one or more predetermined wavelength range in response to pumping energy, and plurality of light scattering elements comprising filler particles formed from an optically transparent material surrounded with void regions. The void region may be filled with gas. Generally, the optically active structure may comprise optically active semiconductor nanoparticles of two or more types configured to emit light of two or more predetermined wavelength ranges. The optically active nanoparticles and the void regions may typically be embedded in a common matrix. In some embodiments of the invention, the void regions may be regions surrounding filler particles. The filler particles may comprise optically transparent filler particles, configured for being optically transparent for at least wavelength range of the emitted light. Generally the filler particles may be configured absorb no more than 20% of optical radiation of the emitted wavelength range. In some embodiments the pumping energy may be optical pumping in one or more exciting wavelength range, the filler particles may be configured to be optically transparent to the emitted light and the exciting light. In some embodiments, the filler particles may comprise filler particles having optically active particles embedded therein (e.g. rod shaped optically active nanoparticles).

The optically active particles may be semiconductor nanoparticles configured to emit light in response to input pumping energy (e.g. pumping light). The semiconductor nanoparticles may be Quantum dots type nanoparticles or anisotropic nanoparticles (i.e. having a dimension along one axis being longer with respect to a perpendicular axis thereof), such as rod shaped (nanorod) type semiconductor nanoparticles. In the case of nanorod nanoparticles or general anisotropic nanoparticles, the nanoparticles may be aligned along a predetermined axis to thereby provide substantially polarized emission of the optically active film. The optically active anisotropic semiconductor nanoparticles (nanorods) may be configured as dot-in-rod or rod-in-rod nanostructures.

In some embodiments the semiconductor nanoparticles may have material composition selected from the groups consisting of: CdS, CdSe, CdTe, ZnS, ZnSe, ZnSeS, CdZnS, ZnTe, ZnO, GaAs, GaP, GaAs, GaSb, HgS, HgSe, HgTe, InAs, InP, InSb, InGaP, AlAs, AlP, AlSb, $Cu_2S$, $Cu_2Se$, $CuInS_2$, $CuInSe_2$, $Cu_2(ZnSn)S_4$, $Cu_2(InGa)S_4$.

According to some embodiments, the filler particles may comprise particles containing at least some of the optically active semiconductor nanoparticles, thereby absorbing light of a predetermined wavelength range and emitting light of another predetermined wavelength range. In this configuration, light emitted from nanorods located within the filler particles or between them may generally be scattered by interfaces associated with the void regions surrounding the filler particles.

It should be understood that the filler particles are made of an optically transparent material, and these particles are thus generally described herein below as optically transparent filler particles. However, in some configurations where the filler particles contain optically active particles, the resulting structure of the filler particle with the emitting nanoparticles embedded therein, becomes absorbing to a certain level.

According to some embodiment, the void regions may be anisotropic region having dimension along one axis longer with respect to at least one other axis. The anisotropic void regions may be aligned such that a longer axis thereof being within a plane defined by the optically active structure. When aligned nanorods are used as optically active particles, the anisotropic void regions and nanorods may be aligned along a common axis.

Generally, the optically active structure may be configured with concentration of the plurality of scattering elements selected in accordance with thickness of the optically active structure to provide haze level between 60% and 95% to the optically active structure. In some embodiments the concentration of scattering elements may be selected to provide haze level between 80% and 95%, or haze level between 87% and 95%.

The optically active structure may further comprise at least one barrier layer configured for reducing interaction of at least one of oxygen and moisture with said optically active structure.

According to some embodiments, the optically active structure is configured for use in a back lighting unit for a display device, typically a flat panel display such as liquid crystal display device (LCD).

According to one other broad aspect of the invention, there is provided a backlight unit configured for use in a display device. The back light unit comprises an optically active film comprising optically active particles configured to emit light of one or more predetermined wavelength range in response to pumping energy, and plurality of light scattering elements comprising filler particles formed from an optically transparent material surrounded with a void region.

The optically active structure of the backlight unit may comprise a plurality of optically active rod shaped semiconductor nanoparticles aligned along a predetermined axis. Additionally or alternatively, the scattering elements may be configured as filler particles surrounded by anisotropic void regions, said anisotropic void regions being aligned along a predetermined axis.

According to yet another broad aspect, the present invention provides a method for use in producing optically active structure. The method comprising providing a liquid solution comprising a mixture of a polymeric material, a plurality of optically active nanoparticles of one or more predetermined size and material composition, and a plurality of optically transparent filler particles; drying and stretching said solution along at least one axis to a predetermined length variation ratio to thereby form elongated void regions around said optically transparent filler particles.

The optically active nanoparticles may be rod shapes semiconductor nanoparticles, the predetermined length ratio of stretching may be set to be such that stretching of the material cause alignment of the rod shapes semiconductor nanoparticles along the predetermined axis.

In some embodiments, the method may further comprise: selecting said polymeric material and said optically transparent filler particles as having a first and second glass-liquid transition temperatures ($T_g$) respectively, said first glass-liquid transition temperatures is lower than the second glass-liquid transition temperatures. Stretching of the structure may be performed at a temperature being between said first and second glass-liquid transition temperature.

In the embodiments utilizing the optically active nanorods, the stretching provides for concurrently creating the scattering voids, alignment of the nanorods and the alignment of the voids-filler structure.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIGS. 2A and 2B illustrate schematically a use of void surrounded particle according to some embodiments of the invention.

DETAILED DESCRIPTION

The present invention provides a novel configuration for an optically active structure, e.g. for use in backlighting unit of a display device (typically Liquid Crystal Display (LCD) devices). The optically active structure according to the invention is configured for increasing out-coupling of emitted light away from a film/layer that contains light emitters. More specifically, the optical active structure (also referred to herein as film or as layer) may be configured in the form of a matrix, e.g. polymer, which contains emissive materials such as semiconductor nanoparticles (e.g. nanocrystals).

As indicated above, such film/layer may be configured for use as a light source for various lighting applications and in particular the backlight of flat panel displays such as LCD devices. In some cases the optically active structure is configured to emit polarized light providing increased efficiency of backlight and output intensity from the flat panel display (e.g. LCD). Typically, such increased efficiency of the back lighting may be beneficial for high resolution displays (such as 4K or 8K display systems), which generally have lower transmission characteristics though the LC panel. Generally, the optically active structure is configured to emit substantially polarized light, to thereby reduce losses due to filtering of light components having undesired polarization orientation. Additionally, the optically active structure is preferably configured to output the emitted light substantially towards a desired direction and reduce light intensity directed to undesired directions, e.g. sides. As also indicated, the optically active structure comprises scatterers generating certain haze levels. This provides a diffusive effect affecting light emission from the film, which may be sufficient to provide uniform illumination and omit the need for using an additional diffuser film within the backlight unit. For example, in an edge-lit backlight the optically active structure according to the present invention may be placed on a lightguide directing light from the pumping light source towards the optically active structure. In this configuration, the optically active structure changes the directionality of the pumping light (e.g. blue pumping light), enabling more pumping light to be directed normal to the film instead of propagating at large angles.

More specifically, the optically active structure is typically configured as a solid slab-like structure that is substantially transparent to the wavelength ranges of light that are emitted by the nanoparticles of the structure (transmitting more than 70% of the emitted light). The matrix (e.g. polymer) of the optically active structure is generally also transparent to wavelength range of the pumping light (i.e. transmitting more than 85% of the light). Specifically, the optically active structure includes at least one layer/film including light emitters and at least partially polarization preserving scatterers. The scattering elements are generally embedded in a common matrix with the light emitting particles. The scatterers are configured to be substantially transparent to the wavelength of at least the emitted light, and typically include elongated voids. The voids are typically configured to be around filler particles (surrounding the filler particles), which are substantially transparent to the pumping light and the emitted wavelength range (or typically absorbing less than 20% of emitted and pumping light).

As indicated above, the optically active structure (OAS) is generally configured to provide color converting function to provide optical illumination of predetermined wavelength composition, e.g. white light having desired color temperature, and additional desired characteristics. Typically, the OAS is configured for absorbing pumping light of light of relatively short wavelength, e.g. blue, violet or ultra violet (UV), and emit in response light of one or more longer wavelength (e.g. green and red). Additionally, the OAS is configured to direct the emitted light such that at least a substantial component of the emitted light propagates along a desired one or more directions away of the OAS, preventing light trapping (wave guiding) in one or more layers. To this end, the OAS includes plurality of light emitters and scatterers within the matrix of at least one layer of the OAS. As indicated above, the light emitters are generally semiconductor nano-particles having material composition and size selected to provide desired wavelength of emission in response to appropriate pumping. The scatterers in the OAS are configured to deflect propagation of light components emitted by the nanoparticles to thereby cause light to propagate outside of the OAS and prevent as much as possible light trapping within the optically active film by total internal reflection (TIR). In addition, the scatterers may be configured to deflect the pumping light as well and thus providing increased diffusion, and prolonged optical path, of the pumping light within the OAS. Such increased diffusion may contribute to provide better homogeneity of the outputted light by ensuring that the pumping light reaches all regions of the OAS to excite the nanoparticles therein. Additionally, prolonged optical path of the pumping light increases the interaction of the pumping light with optically active nanoparticles, and therefore allows minimizing of the required nanoparticles quantity in the OAS. Moreover, scattering and diffusion of the pumping light in addition to scattering of the emitted light may also provide increased angular directionality of emission and provide similar properties for both pumping light and nanoparticles' emitted light. This in turn reduces any color dependence on angular viewing direction.

Figure 1A:
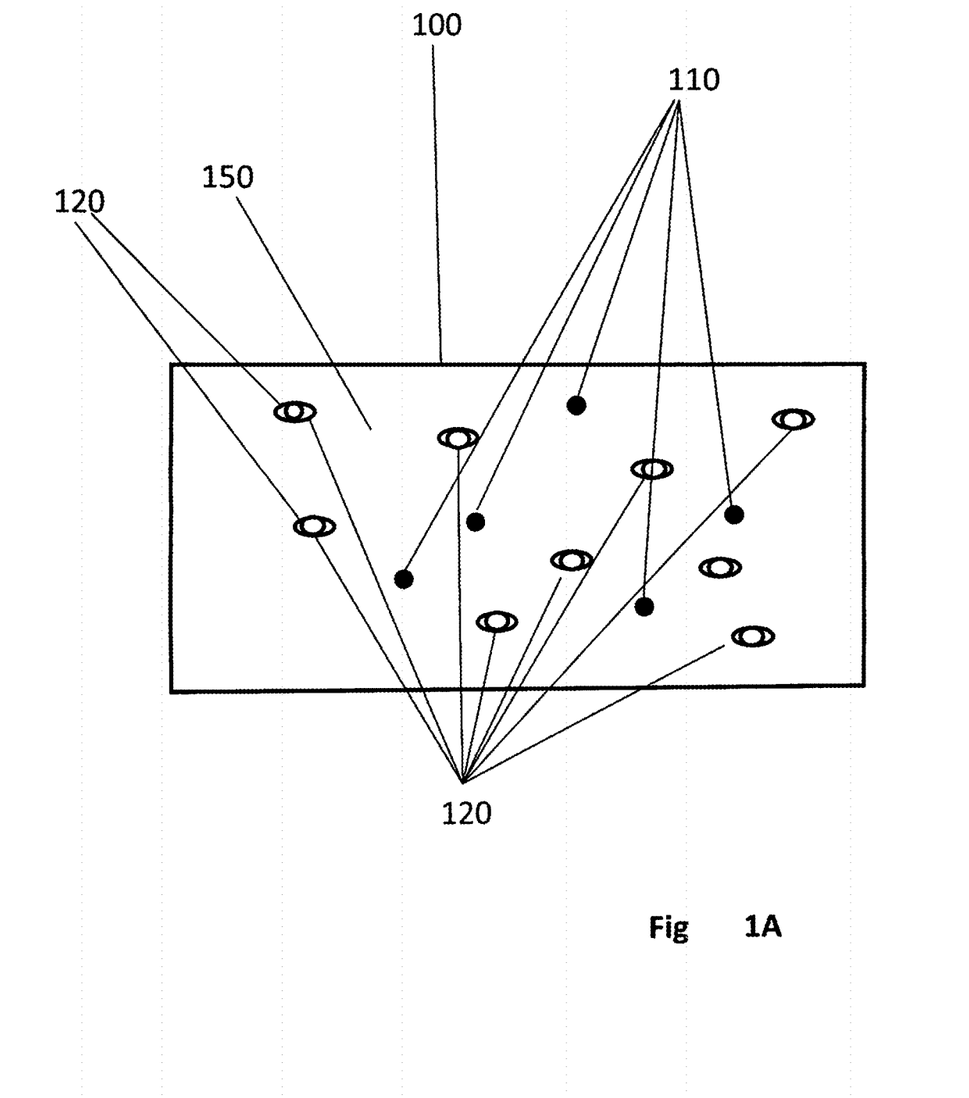
FIG. 1A illustrates schematically an optically active film containing light emitters and scattering elements configured small filler particles located within elongated voids in the film.
Figure 1B:
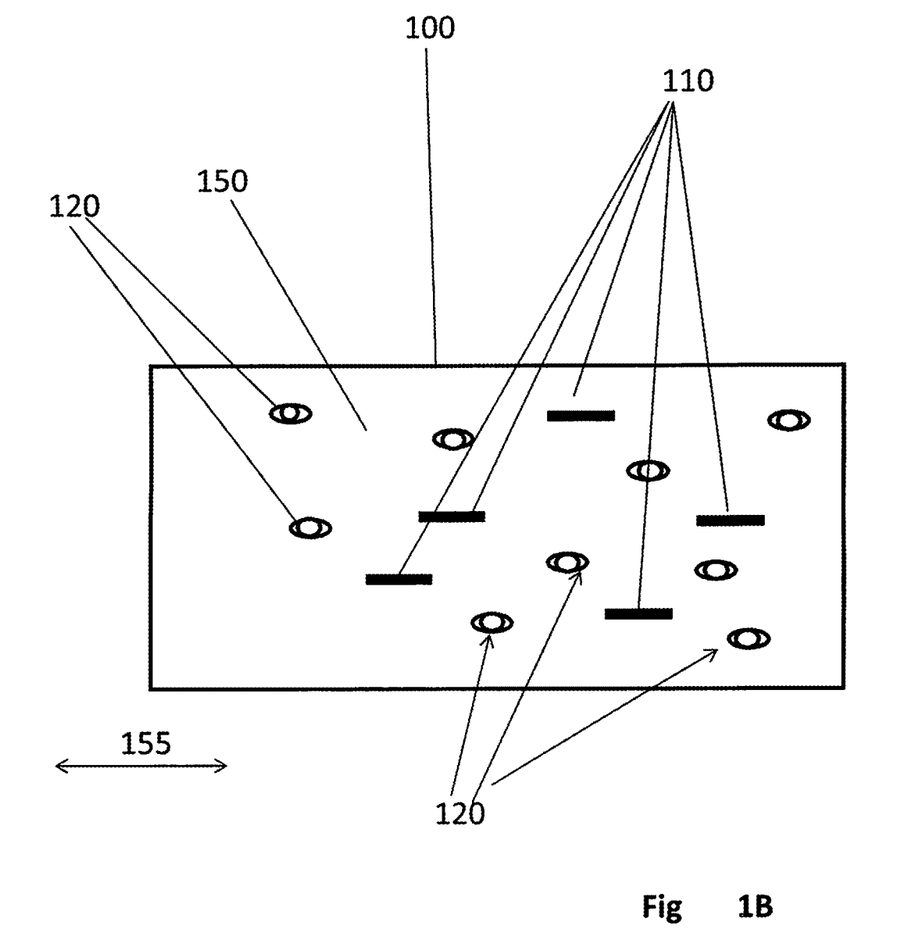
FIG. 1B illustrates schematically an additional configuration of an optically active film containing anisotropic light emitters and anisotropic scattering elements configured of small particles located within elongated voids in the film.

To provide the above described light conversion and scattering functions, the optically active structure 100 is designed to contain both semiconductor nano-particles (e.g. quantum dot material) 110 and light scattering structures 120 as exemplified in FIG. 1A. The nano-particles 110 may be spherical or anisotropic nano-particles. It should be noted that the selection of nano-particles may be based on material properties, desired wavelength ranges of emitted light and additional characteristics of the emitted light such as polarization properties. Additionally, when anisotropic nano-particles used in order to emit at least partially polarized light, the nano-particles (e.g. nanorods) are preferably substantially aligned to provide substantially uniform polarization properties of the emitted light. This is exemplified in FIG. 1B. Generally, the nanorods are aligned along a predetermined axis while allowing deviation of up to 30° to provide light emission with polarization ratio of at least 1.1. As shown in FIGS. 1A and 1B, the light emitting particles 110 and scatterers 120 are embedded in a common matrix 150 while being dispersed within the matrix.

It should be noted that to provide efficient transmission of the emitted light through the preferred surface of the OAS providing desired illumination, the OAS may include, or be attached to, a reflecting surface located on the opposite surface with respect to direction of light out propagation. The reflecting surface may be partially or fully reflecting, and may be configured to transmit light of the wavelength of the pumping light for back-pumping configurations.

Figure 2A:
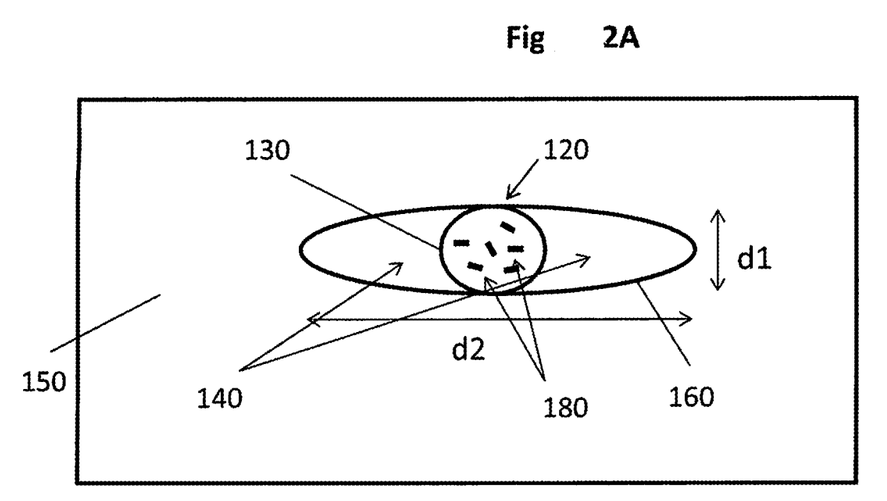
FIG. 2A shows an elongated scattering element surrounded by a matrix material and surrounds an inside filler particle containing nonaligned semiconductor quantum material.
Figure 2B:
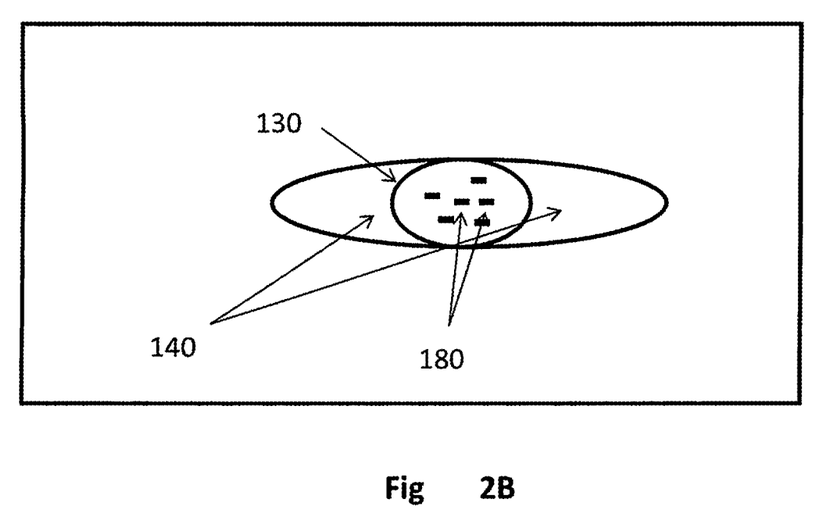
FIG. 2B shows an elongated scattering element surrounded by the matrix material and surrounds an inside filter particle containing aligned anisotropic semiconductor quantum material.

Reference is made to FIGS. 2A and 2B illustrating additional configuration of the emitting particles and scatterers in the OAS according to some embodiments of the invention. FIGS. 2A and 2B show an exemplary scattering element 120, being one of a plurality used in the OAS, where one or more light emitting particles are embedded within a substantially transparent element (i.e. absorbing less than 20% of input light and emitted light), filler 130, surrounded by a void region. The filler 130 may generally be of scale dimension of 0.5-50 micrometer in diameter, or preferably 1.5-10 micrometer in diameter, and having refractive index being not extremely different than that of the matrix 150 of the OAS with respect to wavelength range of the emitted light. For example, the filler particles 130 may be selected to be particles of transparent material. The fillers 130 are surrounded by a cavity that contains material of lower refractive index (e.g. close to 1) such as gas (e.g. air, Nitrogen, or other gasses) defining a "void" 140. Thus the light scatterers 120 (light scattering structures) are embedded in the transparent matrix 150, referred to as "matrix", to provide a light emitting layer of the OAS. As indicated above, the matrix 150 may typically be formed of a polymer film or polymer layer. In the structure according to this embodiment, light is efficiently scattered and out-coupled at the gas-polymer interface 160 of the voids 140 and as a result light trapping in the matrix layer 150 by total internal reflection is minimized. Also shown in FIGS. 2A and 2B are nanoparticles 180 embedded in the material of the filler particles 130. These nanoparticles may or may not be used in accordance with specific embodiments of the present invention as will be described further below.

As indicated above, the scattering elements 120 may be configured as voids 140 contain a transparent filler particles surrounded by a region of gas. Generally, the void scatterers are configured to be anisotropic and having a one longer dimension with respect to two shorter dimensions. Thus the voids may be elongated, having a long axis d2 and a short axis d1 being of a different scale. Additionally, the void regions 140 surrounding the filler particles 130 may be significantly larger along at least one dimension with respect to the filler particles 130. For example, a typical dimension of the long axis d2 of the voids may be a multiple of 1.5-10 with respect to a typical dimension of the filler 130 located therein. In some configurations, the short axis of the voids may be of the order of the dimension of the filler particle.

Thus, the anisotropic shaped voids 160 may have an oval, or oval-like shape (as shown in FIGS. 2A and 2B) where the short axis size, d1, is determined by the filler size and the longer axis, d2, is larger with respect to the filler size. Generally the longer axis d2 of the void 160 can be controlled by the filler size as well as by the production methods. Typically the dimensions of the long axis, d2, is a multiple of 1-10 of the lateral dimension of the filler 130. The shape of void 160 determines the long axis of the light scattering structure 120. Therefore the light scattering structure 120 can have one axis with longer dimension and the population of the light scattering structures inside the (polymer) matrix may have a preferred alignment direction (155 in FIG. 1B).

According to some embodiments of the invention, the refractive index of the filler and the matrix may be substantially similar (i.e. a difference of refractive index between the filler particles and the matrix is below 0.1). This causes the direct interfaces between the filler and the matrix to be substantially not scattering, while the interfaces between the matrix and the void region, or filler and void region exhibit change in refractive index and thus cause scattering. These configurations provide a strong geometrical selective scattering. For example, turning back to FIG. 1B, when rod shaped nanoparticles (nanorods) are used as the light emitting structures 180, the OAS may be configured such that a long axis of the void 160 thereof is oriented within the plane of the film, i.e. for a relatively thin film, and even parallel to alignment axis of the nanorods (when aligned). This orientation of the scatterers 120 provides that light components propagating within the plane of the film interact with the matrix-void interface and scatter away from the film, while light components propagating in a direction perpendicular to the plane of the film propagate through the film and output therefrom, undergoing only limited scattering effects. Such orientation of the scatterers provides for selective scattering of light components propagating within a plane defined by the OAS with respect to light components passing through the OAS (such as pumping light). More specifically, the orientation of the scatterers provides greater cross section for scattering for light components propagating within the film of the OAS containing the emitting particles and lower cross section for scattering for light components propagation in a direction perpendicular to the plane defined by the film of the OAS. Generally light components (rays) emitted by the particles may propagate within the embedding film/matrix in a direction of propagation parallel to the plane to the film surface, thus being trapped in the film due to total internal reflection and impinging onto the interface thereof with an angle $\theta$ being larger that $\theta_c$ the critical angle for existence of total internal reflection. By scattering such light components, the OAS according to the present invention increases light out coupling from the OAS.

As indicated above, the nanoparticles in the OAS provide emitted light being at least partially polarized, and thus reducing loss of light components (by reducing the intensity of light components of the undesired polarization that need to be filtered out). According to some embodiments of the invention, the light emitting nanoparticles are anisotropic nano-particles, defining anisotropic quantum material, and more specifically nanorods. Typical size and dimensions of the nanorods are generally determined in accordance with material composition and desired wavelength of emission. Generally, the nanorods may be configured with long axis of typical size between 7-100 nm while the short axes thereof may be of typical size between 3-10 nm. In some embodiments, the nanorods may have long axis of 14-50 nm and short axes of 3-7 nm. Light emission from optically active nanorods is substantially polarized along the orientation of the long axis of the nanorods and is directed perpendicular to the long axis of the nanorods, generally providing polarization ratio of 1.1 or more, and preferably providing polarization ratio of 2 or more.

According to some embodiments of the invention, the OAS includes light emitting nanorods and elongated void-type scatterers as described above. In these configurations both the elongated scatterers and the rod-shaped light emitters (nanorods) are aligned along a common axis, as exemplified in FIG. 1B. As shown in FIG. 1B, both the nanorods emitters and the elongated scatterers (long axis of the void) are aligned along a common axis 155. In this configuration, the elongated scatterers substantially maintain polarization orientation of light components emitted by the nanorods and undergo scattering.

Generally, the OAS may be configured with scatterers' concentration such that the OAS has haze level of 60% to 95%, preferably between 80% and 95%, more preferable between 87 and 95%. This is provided by adjusting the concentration of the scattering elements (and the fillers). It should be noted that higher haze level (e.g. higher than 95%) may typically reduce the luminance of the backlight due to over-scattering of light components. Similarly, low haze levels, e.g. below 60% haze, may result in reduced excitation of the optically active nanoparticles as well as reduced out-coupling of emitted light from the OAS.

The term "haze" means the ratio between the diffuse transmitted light and the total transmitted light. Diffuse transmittance is defined as the percent of light passing though the sample excluding a 2.5 degree angular range from the incident light angle. To simplify matters, haze values are used herein in percentage rather than fractures.

For example, the optically active structure (OAS) may include filler concentration between 0.5% wt to 40% wt, which is substantially similar to weight concentration of the scatterers including the voids, as air or any gas used is relatively light. Additionally or alternatively, the OAS may contain scattering elements (voids) that occupy 5% to 50% from the total volume of the OAS (more preferably 5% to 30%) and are spread evenly or unevenly in the film.

More specifically it should be noted that the optimal level of filler concentration depends on thickness of the film of the OAS. For example, in an OAS having film thickness of about 50 μm is preferably embedded with 3-8% wt fillers. A substantially similar OAS of thickness of about 30 μm may preferably include double the filler concentration, i.e. 6-16% wt, in order to compensate for the shorter optical path within the OAS. An OAS of thickness of about 10-15 μm may be used with 20-40% wt fillers.

According to some other embodiments, as exemplified above with reference to FIGS. 2A and 2B, the light emitting nanoparticles 180 are encapsulated within the filler particles 130, which are in turn, surrounded by the voids 140. As also noted, the light emitting nanoparticles 180 may include both isotropic shaped Quantum dots (QDs) and preferably non spherical, anisotropic, nanoparticles such as elongated shaped nanorods 180 as exemplified in FIGS. 2A and 2B. When nanorods are used as optically active nanoparticles, the orientation of the nanorods 180 is preferably aligned in accordance with geometry of scattering element, generally being parallel to the long axis of the voids 140. This configuration provides increased uniformity in distribution of the emitted light as well as reduces changes in polarization of light due to scattering. The above effect of proper alignment of the nanoparticles 180 and the scattering particles/voids 140 is a result of interaction properties of light at the interface between the film and the scattering voids 140.

It should be noted that the use of void-type scattering elements in the OAS according to different embodiments of the present invention provides for greater maintenance of polarization properties of emitted light with respect to particles type scatterers alone. Specifically, light interaction with the interface of the void and the matrix or the void and the filler (or the void the matrix) may behave as a preferential light redirecting element for the polarized emission from the nanorods that maintains the polarization.

The light scattering structure may also provide for diffusing of the excitation/pumping light and increase optical path thereof within the OAS. This provides more efficient absorption of the excitation light and improved directional properties for the combined outputted light. Generally when visible light is used as pumping light, e.g. blue pumping illumination, a portion of the pumping light may take part in the output light of the OAS. In such configurations, the pumping light has substantially similar directionality as the emitted light from the nanoparticles (i.e. both pumping and emitted light have similar trend of angular distribution).

The degree of light out-coupling from the optically active film may depend on the following factors: (a) scatterers dimensions and in particular dimensions of the voids; (b) the size of the fillers, typically between 0.5 to 50 μm, and preferably is 1 to 25 μm; and (c) fillers concentration in the optically active layer as indicated above. It should however be noted the additional factors may effect light out coupling from the film. In general the light traveling in the matrix is be effectively redirected by the voids in accordance with the cross section for scattering of the scatterers and with the angle of propagation, and the geometry of the scattering voids and on the respective refractive indices of matrix and void. In this connection, the filler, or filler particles, may be made of various materials including epoxy, glass, silica, sapphire or different types of polymers (including cross-linked polymers). Specific examples of polymers include polymers selected from fluorinated polymers, polymers of Ployacrylamide, polymers of Polyacrylic acids, polymers of Polyacrylonitrile, polymers of Polyaniline, polymers of Polybenzophenon, polymers of poly(methyl mathacrylate), silicone polymers, Aluminium polymers, polymers of Polybisphenol, polymers of Polybutadiene, polymers of Polydimethylsiloxane, polymers of Polyethylene, polymers of Polyisobutylene, polymers of Polypropylene, polymers of Polystyrene, Polyvinyl polymers (e.g. polyvinyl butyral, polyvinyl alcohol) and acrylic polymers (polymethyl methacrylate). The filler may be spherical but can also be of other shapes such as an oval shape or hollow spheres.

As indicated above, the OAS generally includes light scattering elements located within the same film as the nanorods. Additionally, according to some embodiment of the invention the OAS may be configured with light scattering structure/elements placed in specific regions of the OAS, e.g. located closer to one surface of the OAS/film. In some embodiment the OAS may include two or more films that contain light scattering structure and nanorods in various configurations such as: two nanorod films with a light scattering structure film inside; one nanorod film with two light scattering structure films etc. The films should preferably be optically attached between them to provide the required scattering function of disrupting the total internal reflection (TIR) condition.

It should also be noted that the OAS of the present invention may include, or be attached to one or more barrier layers. Such barrier layers may be configured to provide mechanical and/or chemical protection to the OAS films. For example, the barrier layers may provide protection from scratching, folding, shrinkage, damage from moisture absorption, damage from oxidation of the nanoparticles or any other external damage. The one or more barrier layers are preferably configured to be thin and substantially parallel to reduce any refractive effects on the emitted light.

In some embodiments the optically active film can be used as a lightguide edge-coupled to blue LEDs. In such a structure the optically active film can contain nanorods and light scattering structure elements evenly distributed within the optically active film.

As indicated above, the OAS of the present invention may preferably be configured for use in a backlighting unit, e.g. of a display device. To this end the OAS may be placed in an optical stack with additional diffusers, additional light redirecting films (e.g. prism films) and polarization recycling films (e.g. Brightness Enhancement Film, Dual Brightness Enhancement Film (DBEF), etc.). The optically active film may preferably be optically connected to different optical elements in the backlight stack or to the bottom polarizer of the LC cell. The optically active film can have blue pumping and provide red and green nanorods emission or other possibilities (e.g. UV pumping with RGB nanorod emission).

It should also be noted that the OAS according to the present invention may be configured to operate as a lightguide/waveguide for directing pumping light from a side-illumination pumping unit. Additionally, the OAS may be configured for use in an omnidirectional display unit (e.g. LCD) providing wide solid angle for view. A single light redirecting film attached to the OAS may also be used to provide uniform illumination within a relatively wide solid angle associated with a single axis or more. Generally, as also indicated above, an appropriate film stack utilizing the OAS of the invention may be used in backlighting unit and an LC panel to constitute a flat panel display device.

In addition to the capability of the optically active film of the present invention to provide emission of substantially polarized light of one or more predetermined wavelength ranges and direct the emitted light towards a preferred direction. The OAS, of the present invention provides additional advantages involving production techniques thereof. In this connection, the OAS may be produced by uniaxial or bi-axial stretching of the matrix, at ambient temperatures being higher than room temperature. In this method addition of a thermoplastic polymer or resin filler particles which are not miscible into a host matrix (e.g. polymer matrix) and after stirring of the mixture, allowing it to dry and then stretching the film along one or more axes. Alternatively or additionally, the filler particles may be or include organic or inorganic filler particles.

It should be noted that stretching of the film is generally preferred as it require relatively low processing temperatures, and thus have no, or very limited, influence on the performance of the emissive material embedded in the film.

Additionally, stretching of the film may also be used to provide alignment of embedded nanorods, as well as alignment of the void scatterers around the filler particles. The direction of stretching of the film is typically also the direction of alignment for both the nanorods and for the light scattering structures. Generally, stretching of the film provides high performance in creating voids around the filler particles when the glass-liquid transition temperature [$T_g$] of the filler is higher compared with the $T_g$ of the matrix material. This causes the matrix to stretch around the filler particles and generate void regions around the fillers. This is preferred for some embodiments, where the light emitting nanoparticles are embedded in the matrix, while not being within the filler particles.

To provide alignment of filler embedded nanorods the stretching is performed at temperatures higher than the glass-liquid transition temperatures of both the matrix and the filler particles. More specifically, the temperature condition is preferably such that $T_{amb}$>$T_g$[film matrix], $T_{amb}$>$T_g$[filler] and $T_g$[filler]>$T_g$[film matrix]. This will enable the filler to stretch but still to produce a void due to different response of the two materials at the same ambient temperature. The entire film is stretched and the inner particles may also be elongated with its nanorods aligned by the stretching. The stretching may be of the order of ×1.5 to ×10 preferably ×3 to ×6 with respect to original dimension of the film.

Apart from the stretching method described above, additional mechanical methods are often used. Typical methods include extrusion of polymer films which contain the emissive material and filler as follows:

Foaming method: adding a foaming agent to the polymer to make the polymer film foamed by heat in the step of extrusion or film processing or foamed through chemical decomposition;

Bubbling method: adding a vapor such as Nitrogen or other vaporizable substances to the polymer during or after its extrusion to thereby make the polymer film foamed;

Pure Melt-extrusion method: melt-extrusion of films that contain thermoplastic polymer or resin not miscible with host polymer or organic/inorganic filler particles.

If the OAS is composed of two or more layers/films each layer can be produced with a different technique optimized for its function and material composition. For example lower melt temperature for the emitting nanoparticles containing film. The films can be laminated or optically attached in a subsequent production step.

The dimension and geometry of the light scattering structures are selected in accordance with demands of the manufacturing process with respect to the chemical composition of the selected particles. The efficiency of the light out-coupling and the polarization preserving properties can be controlled by changing the manufacturing process.

The light out-coupling efficiency of the OAS may be controlled by proper selection of the dimensions and the concentration of the voids within the film. The concentration for example can be increased by increasing the amount of immiscible fillers inside the film. Typical concentration of fillers provided sufficient improvement in light-out-coupling may preferably be in the range of 0.1 to 50% wt, more preferably 3 to 40% wt. It should be noted, as indicated above, that the actual concentration of the fillers generally depends on the thickness of the optically active film. Generally, thinner layers will require higher concentrations to compensate for the shorter optical path length. Typically, as also indicated above, the amount of fillers is adjusted to achieve high level of haze, in the range of 65 to 95%, preferably between 80 and 95% and more preferably in the range of 87 to 95%.

The shape and size of the voids is controlled in a few manners. The length of the voids is determined in accordance with a stretching ratio (×2 to ×10) of the OAS. Larger stretching factor will produce longer voids. Additionally selection of the ambient temperature for stretching may be used to determined dimension of the voids.

The Filler particles may be made of inorganic materials such as $TiO_2$, $BaSO_4$, silica or polymer micron-sized beads made of materials such as poly(methyl)methacrylate (PMMA) or polystyrene (PS) or other materials as indicated above. Selection of the refractive index and $T_g$ of the materials provide tunability for the light scattering properties of the light scattering structures.

It should be noted that, as indicated above, additional protective films, such as gas barrier films and mechanical support films, may be used, being connected or laminated to the optically active film. These additional films may also provide additional optical activities such as light redirecting and diffusion of the emitted light to adjust optical out-coupling properties.

The processes described above can take place at ambient atmosphere or under inert gas at room atmosphere or above. In some cases only part of the process may be conducted under inert atmosphere while other parts of the process, such as stirring or stretching may be performed in ambient conditions.

As indicated above, the OAS utilizing nanorods according to the present invention provides significantly higher optical output as compared with films that do not utilize scatterers. The OAS provides emission of polarized light with polarization ratio (PR) values ranging between 1.1 and 10, or between 2 and 7, or between 3 and 5, depending on the nanorods intrinsic polarization (determined by geometrical parameters and material composition of the nanorods), the degree of nanorods alignment in the film and the concentration of scatterers. Utilizing optional suitable polarization maintaining optical stack in addition to the optically active film described above may provide up to 60% increase in the energy efficiency as compared to films that use QD films, while improvement of 30% may also be a significant energy saving.

In addition to the energetic efficiency associated with light emission from the OAS, the use of aligned nanorods providing polarized output illumination contributes to optical stacks that are thinner or have less components, e.g. by obviating the need to "recycle" light of non-preferred polarization. As greater ratio of the emitted light is of the preferred polarization orientation, the efficiency of a corresponding display device is increased. Additionally, some elements of the optical stack (e.g. reflective polarizer) may be left oat with little to no reduction in brightness.

EXAMPLE

Figure 3:
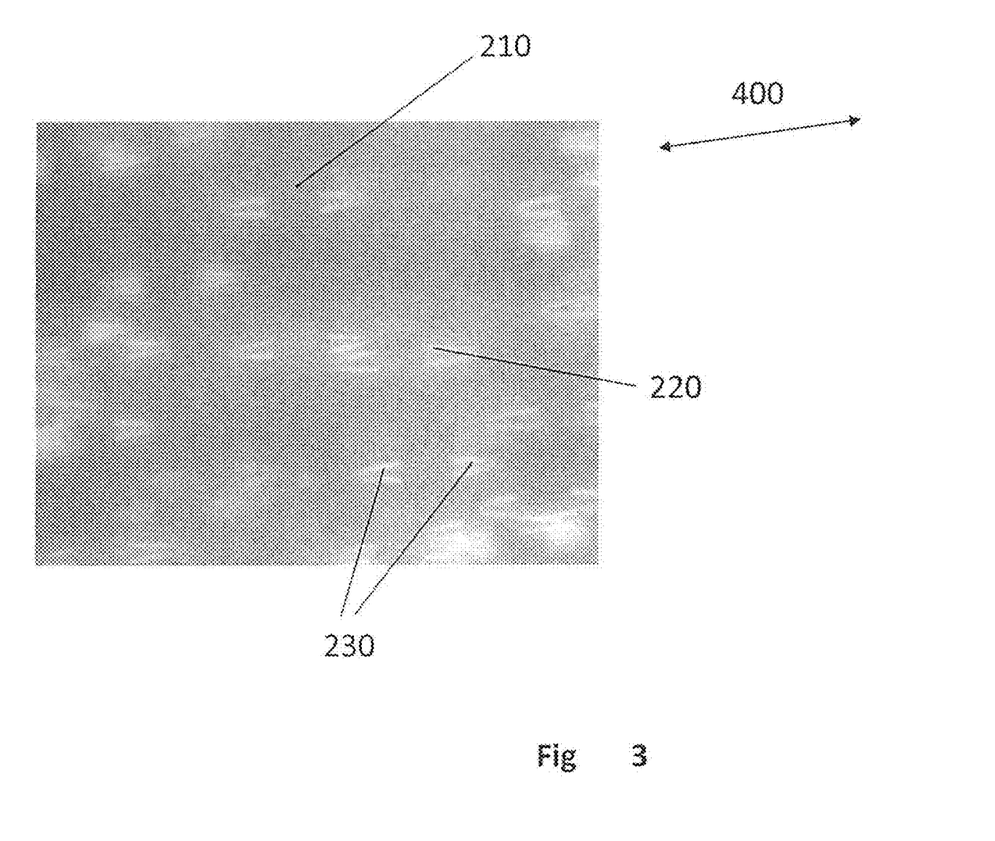
FIG. 3 shows an optical microscope image of an optically active film including optically active nanorods and scatterers according to embodiments of the present invention.

A layer of the optically active structure, configured for emitting polarized light with efficient light out-coupling was prepared by alignment of nanorods within a polymer matrix which can be made to contain scattering voids. The nanorods were aligned by mechanical stretching of the polymer film. As a first step, the required amount of nanorods and cross-linked PMMA micro-beads (diameter 6 μm, refractive index 1.48, $T_g$=125° C.) were mixed with an aqueous solution of polyvinyl alcohol (PVA), typically 5-7% wt. The concentration of the beads was 6% wt of the PVA. The mixed solution was then cast into a mold and dried at 40° C. in an oven for 18 hours to form a film having thickness of 50 μm. To align the nanorods, the film was stretched uniaxially at 100° C. by a factor of 3. Since the stretching temperature was above $T_g$ of PVA and below $T_g$ of the PMMA beads, voids were formed around the polymer beads during stretching. The PMMA beads and PVA matrix have similar refractive index ($n_{filler}$-$n_{matrix}$=$\Delta n$=-0.03) and therefore the scattering at the PMMA-PVA interface is negligible. However transparent material with higher mismatch or different sign ($\Delta n \approx \pm 0.1$, $\Delta n \approx \pm 0.18$ or even more) can also be used although some refraction would occur at the interface. This refraction would be still weak compared to the one introduced at the void polymer interface that has a typical refractive index mismatch typically $\Delta n \approx -0.5$. Additionally, the light emitted by the nanorods is out-coupled at the air-PVA interface of the voids. The structure of the film was imaged in an optical microscope as shown in FIG. 3 showing the transparent PMMA beads 210 with an air filled void 220. The interface of the void with the matrix is seen as bright horseshoe-shaped regions 230 due to the strong scattering at the interface. The stretching direction 400 that is also the direction of the long axis of the light scattering structures population is also shown in the arrow in FIG. 3.

Figure 4:
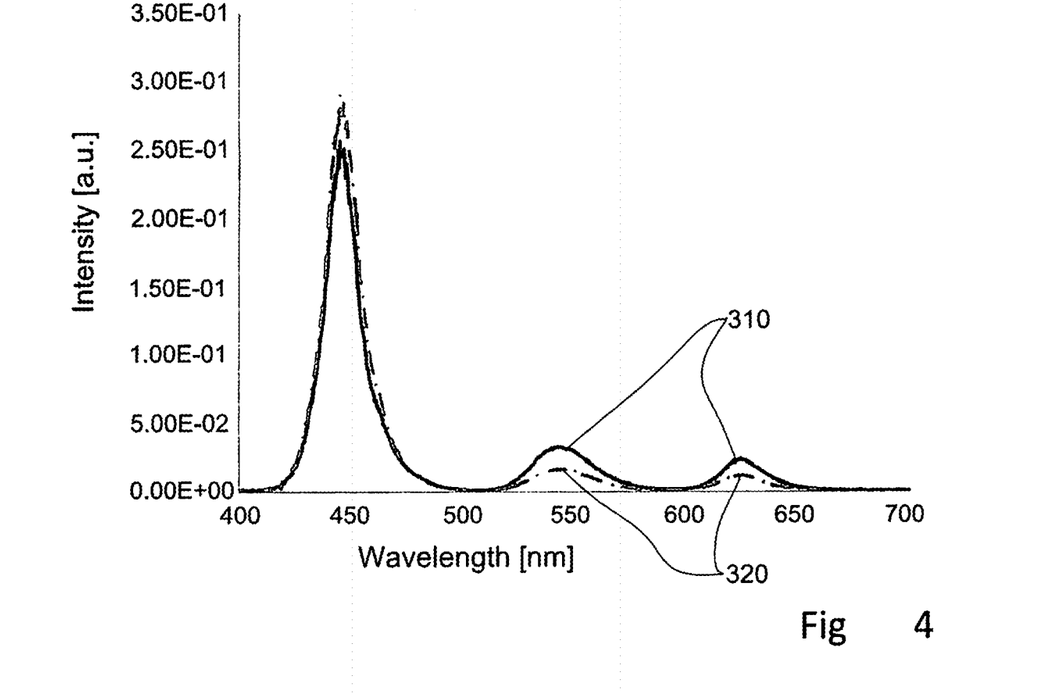
FIG. 4 shows experimental measurements of intensity of emitted polarized light of different wavelength, the graph shows intensity of light emitted with polarization parallel and perpendicular to the alignment direction of the nanorods.

The formation of scattering voids maintains polarization of the polarized emission from the aligned nanorods. This is taking place along with scattering of light from the void/matrix interface. The measured polarization ratio parallel and perpendicular to the alignment axis was 2:1, measured for a film excited by a blue emitting LED (peak wavelength of 450 nm). Measurements of the light output spectrum are shown in FIG. 4 for the two polarization states: the polarization parallel 310 (perpendicular 320) so the nanorods and light scattering structure alignment direction.

Figure 5:
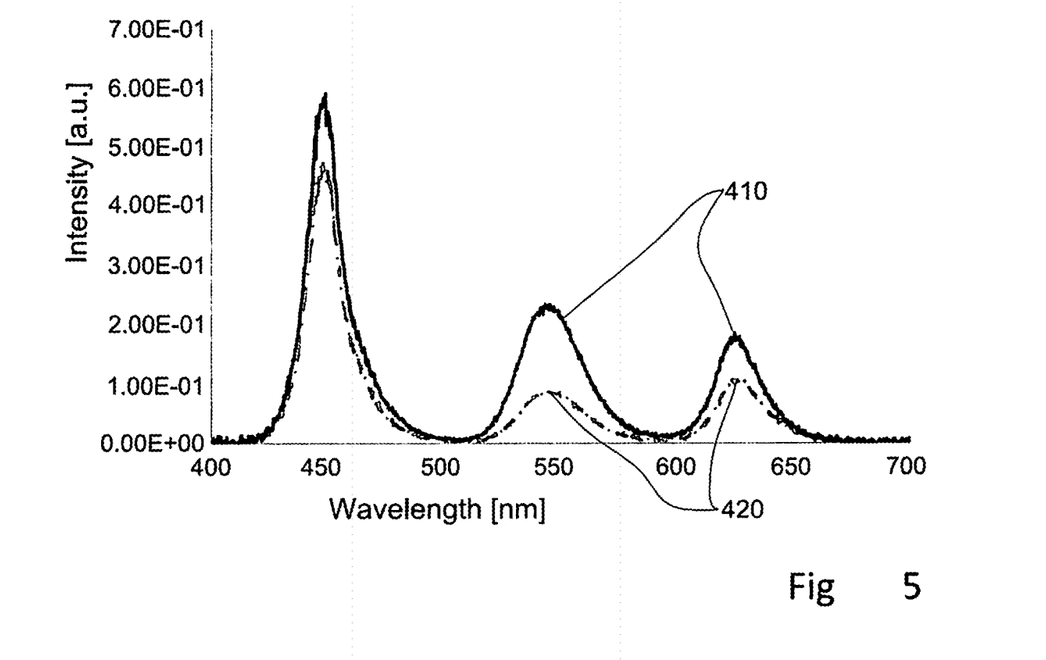
FIG. 5 shows experimental measurements of intensity of emitted polarized light of different wavelength as compared between an optically active layer including scatterers according to the present invention and an optically active layer without such scatterers; this was measured for a film placed on a light-guide with a rear reflective film and a prism film on top of the optically active layer.

In order to construct a backlight unit, the aligned nanorods film with scatterers was placed on a surface of a lightguide plate (slab) coupled to a blue emitting LED bar (central wavelength 450 nm FWHM=20 nm, edge-lit). A highly reflective sheet based on Silver layer coating ("BL film", commercially available from Oike) was placed in the back surface of the light-guide in order to recycle the light emitted backwards. In order to increase the on-axis luminance, prism films with 160 μm pitch and prisms with 90° degrees angle were used. Specific films with a non-birefringent polymethyl-methacrylate (PMMA) substrate were chosen (250 micrometer substrate with retardation below 25 nm). This film was placed parallel to the nanorods alignment axis or in a perpendicular alignment. In FIG. 5 we show the emission of a film with scattering voids 410 and without scattering voids 420 placed in this configuration with a polarizer placed parallel to the nanorods alignment axis. Both films contain the same concentration of nanorods; however the film with voids exhibits higher red and green emission due to improved light out-coupling.

Thus, the present invention provides an optically active structure configured for increased lighting efficiency and out-coupling, and a method for production thereof. The OAS of the invention generally utilizes scatterers in combination with light emitting particles to provide improved light out-coupling and improved energetic efficiency. Those skilled in the art will readily appreciate that various modifications and changes can be applied to the embodiments of the invention as hereinbefore described without departing from its scope defined in and by the appended claims.

The invention claimed is:

1. An optically active structure, comprising a light emitting layer defined by a common matrix, wherein the common matrix has embedded therein a plurality of optically active semiconductor nanoparticles configured to emit light of one or more predetermined wavelength range in response to pumping energy, and a plurality of light scattering elements; wherein each of said plurality of light scattering elements is formed by an optically transparent void region surrounding a filler particle, said filler particles also embedding some of the optically active semiconductor nanoparticles therewithin; such that each of the light scattering elements scatters light originated by emission of the optically active semiconductor nanoparticles surrounded by the respective void regions.

2. The optically active structure of claim 1, wherein said filler particles comprise optically transparent filler particles, configured for being optically transparent for at least wavelength range of the emitted light.

3. The optically active structure of claim 2, wherein said pumping energy comprises optical pumping with at least one excitation wavelength range, said optically transparent filler particles being transparent to said at least one excitation wavelength range.

4. The optically active structure of claim 2, wherein said optically transparent filler particles are configured with absorption of below 20% of the corresponding wavelength range.

5. The optically active structure of claim 1, where said optically active semiconductor nanoparticles being embedded within the filler particles comprise rod shaped optically active nanoparticles aligned along a predetermined axis.

6. The optically active structure of claim 1, wherein said optically emitting semiconductor nanoparticles comprise at least one semiconducting material selected from the group consisting of: CdS, CdSe, CdTe, ZnS, CdZnS, ZnSe, ZnSeS, ZnTe, ZnO, GaAs, GaP, GaAs, GaSb, HgS, HgSe, HgTe, InAs, InP, InSb, AlAs, AlP, InGaP, AlSb, $Cu_2S$, $Cu_2Se$, $CuInS_2$, $CuInSe_2$, $Cu_2(ZnSn)S_4$, and $Cu_2(InGa)S_4$.

7. The optically active structure of claim 1, where said optically active semiconductor nanoparticles in the common matrix and in the filler comprise anisotropic semiconductor nanoparticles, having a dimension along one axis being longer with respect to a perpendicular axis thereof.

8. The optically active structure of claim 7, wherein said anisotropic semiconductor nanoparticles are configured as dot-in-rod or rod-in-rod nanostructures.

9. The optically active structure of claim 7, wherein said anisotropic semiconductor nanoparticles are configured as nanorods, said nanorods being aligned along a predetermined axis to thereby emit light having a selected polarization orientation.

10. The optically active structure of claim 1, wherein said void regions are anisotropic regions having a dimension along one axis longer with respect to a dimension along at least one other axis.

11. The optically active structure of claim 10, wherein said anisotropic voids are aligned such that the longer axis thereof is within a plane defined by the optically active structure.

12. The optically active structure of claim 10, where said optically active semiconductor nanoparticles in the common matrix and/or in the filler comprise semiconductor nanorods, said semiconductor nanorods and said anisotropic voids being aligned along a common axis.

13. The optically active structure of claim 1, wherein the concentration of said plurality of scattering elements is selected in accordance with thickness of the optically active structure to provide a haze level between 60% and 95% to the optically active structure.

14. The optically active structure of claim 13, wherein the concentration of said plurality of scattering elements is selected to provide a haze level between 80% and 95%.

15. The optically active structure of claim 13, wherein the concentration of said plurality of scattering elements is selected to provide a haze level between 87% and 95%.

16. The optically active structure of claim 1, further comprising at least one barrier layer configured for reducing interaction of at least one of oxygen and moisture with said optically active structure.

17. A method for producing an optically active structure according to claim 1, the method comprising providing a liquid solution comprising a mixture of a polymeric material to form the common matrix, a plurality of optically active semiconductor nanoparticles of one or more predetermined size and material composition, and a plurality of optically transparent filler particles having optically active semiconductor nanoparticles embedded therein; drying and stretching said solution along at least one axis to a predetermined length variation ratio to thereby form elongated void regions around said optically transparent filler particles within said common matrix.

18. The method of claim 17, wherein said optically active semiconductor nanoparticles are rod shaped semiconductor nanoparticles having a predetermined length ratio being such that said stretching aligns said rod shaped semiconductor nanoparticles along said predetermined axis.

19. The method of claim 17, further comprising, selecting said polymeric material and said optically transparent filler particles as having a first and second glass-liquid transition temperatures ($T_g$) respectively, said first glass-liquid transition temperatures being lower than the second glass-liquid transition temperatures.

20. The method of claim 19, wherein said stretching is performed at a temperature being between said first and second glass-liquid transition temperature.

21. The optically active structure of claim 1, wherein the optically active semiconductor nanoparticles in the common matrix comprise optically emitting semiconductor nanoparticles.

22. The optically active structure of claim 1, wherein the optically active semiconductor nanoparticles in the filler comprise optically emitting semiconductor nanoparticles.

23. A backlight unit configured for use in a display device, wherein the backlight unit comprises an optically active film formed by a common matrix, wherein the common matrix comprises optically active semiconductor nanoparticles configured to emit light of one or more predetermined wavelength range in response to pumping energy, and a plurality of light scattering elements formed by optically transparent material filler particles surrounded with a void region; wherein said optically active semiconductor nanoparticles comprise optically active semiconductor nanoparticles embedded within said common matrix and optically active semiconductor nanoparticles embedded in said filler particles.

24. The backlight unit of claim 23, where said optically active semiconductor nanoparticles in the common matrix and in the filler comprise a plurality of optically active rod shaped semiconductor nanoparticles aligned along a predetermined axis.

25. The backlight unit of claim 23, wherein said light scattering elements comprise anisotropic void regions, said anisotropic void regions being aligned along a predetermined axis.

* * * * *